United States Patent [19]

Bridger et al.

[11] Patent Number: 5,766,442
[45] Date of Patent: Jun. 16, 1998

US005766442A

[54] ELECTRODE REGENERATION

[75] Inventors: Nevill John Bridger, Hermitage; Andrew Derek Turner, Abingdon, both of United Kingdom

[73] Assignee: AEA Technology PLC, Didcot, England

[21] Appl. No.: 829,614

[22] Filed: Mar. 31, 1997

Related U.S. Application Data

[63] Continuation of Ser. No. 317,412, Oct. 3, 1994, abandoned, which is a continuation of Ser. No. 124,852, Sep. 22, 1993, abandoned, which is a continuation of Ser. No. 646,946, Jan. 30, 1991, abandoned.

[30] Foreign Application Priority Data

Jan. 30, 1990 [GB] United Kingdom ............... 9002079

[51] Int. Cl.$^6$ ........................................................ H02G 1/08
[52] U.S. Cl. ........................... 205/318; 205/687; 205/704; 205/766
[58] Field of Search .............................. 205/318, 687, 205/704, 766

[56] References Cited

U.S. PATENT DOCUMENTS

| | | | |
|---|---|---|---|
| 3,276,910 | 10/1966 | Grasselli et al. | 136/86 |
| 3,421,948 | 1/1969 | Webb | 136/146 |
| 3,490,953 | 1/1970 | Berger et al. | 136/153 |
| 4,548,695 | 10/1985 | Bridger et al. | 204/284 |
| 4,596,641 | 6/1986 | Bridger et al. | 204/151 |
| 4,629,656 | 12/1986 | Alberti et al. | 428/411.1 |
| 4,790,918 | 12/1988 | Bridger et al. | 204/149 |

FOREIGN PATENT DOCUMENTS 1247732  9/1971  United Kingdom.

OTHER PUBLICATIONS

Patent Abstracts of Japan, vol. 11, No. 91 (E-491) 24 Mar. 1987. JP-A-61 243 663 (Hitachi). 29 Oct. 1986.

*Primary Examiner*—Arun S. Phasge
*Attorney, Agent, or Firm*—William H. Holt; William R. Hinds

[57] ABSTRACT

An electrode for use in electrochemical ion exchange which includes a hydrolysable metal phosphate such as zirconium phosphate ($Zr(HPO_4)_2$) which has been hydrolysed at least in part is regenerated. The electrode is made the anode of an electrochemical cell in which the electrolyte is an aqueous solution containing one or more phosphate ions provided, for example, by a dissolved salt (eg $Na_3PO_4$, $Na_2HPO_4$ or $NaH_2PO_4$) or orthophosphoric acid, or both. Preferably, the electrolyte is acidic (eg pH 2). Operation of the cell reverses the hydrolysis reaction and enhances the performance of the electrode.

16 Claims, No Drawings

ELECTRODE REGENERATION

This is a continuation of application Ser. No. 08/317,412 filed Oct. 3, 1994, now abandoned, which is a continuation of application Ser. No. 08/124,852 filed Sep. 22, 1993, abandoned, which is a continuation of application Ser. No. 07/646,946 filed Jan. 30, 1991, abandoned.

This invention relates to the regeneration of electrodes for use in electrochemical ion exchange.

The electrochemical removal of ions from aqueous solutions onto ion-exchange materials, which may be referred to as electrochemical ion exchange or electrochemical deionization, is known for example from UK patents GB 1 247 732, GB 2 150 598, and GB 2 187 761. It involves establishing an electrochemical cell comprising the aqueous solution as electrolyte, a working electrode and a counter electrode, where at least the working electrode incorporates an ion exchange material such as a resin, and applying a D.C. voltage between the electrodes. To remove cations from the solution the working electrode incorporates a cation responsive ion exchange material and is made the cathode. A localised change of pH occurs at the electrode due to generation of OH$^-$ ions which in turn produce active sites thereon for absorption of cations from the aqueous solution. Subsequent reversal of the voltage enables the absorbed ions to be eluted, so the working electrode can be readily regenerated.

The working electrode may comprise a current feeder carrying an intimate mixture of an ion exchange material and a binder. The mixture may also include an electrically conducting material. GB-B-2 150 598 describes one form of such an electrode.

An example of a cation exchange material for use in such a working electrode is zirconium phosphate of the formula $Zr(HPO_4)_2$. Zirconium phosphate is a very useful material in this respect but has the disadvantage of being gradually hydrolysed by hydroxl ions during continued operation in electrochemical ion exchange according to the following equation (1):

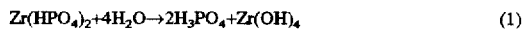

$$Zr(HPO_4)_2 + 4H_2O \rightarrow 2H_3PO_4 + Zr(OH)_4 \quad (1)$$

Consequently, electrochemical ion exchange performance deteriorates and cell voltage increases.

A way of regenerating an electrode such as the above has now been devised. Thus, according to the present invention there is provided a method of regenerating an electrode for use in electrochemical ion exchange which electrode includes a hydrolysable metal phosphate as cation exchange material, which phosphate has been hydrolysed at least in part, which comprises conditioning the electrode by operating an electrochemical cell in which the electrode is an anode and the electrolyte is an aqueous solution containing one or more phosphate ions under conditions such that the hydrolysis reaction of the metal phosphate is reversed to regenerate the metal phosphate.

It has been found that the original performance of the electrode in electrochemical ion exchange can be substantially restored or even enhanced by the present method. Where the cation exchange material is zirconium phosphate, it is believed that the present method reverses equation (1) above.

The phosphate ions in the electrolyte may be one or more of $PO_4^{3-}$, $HPO_4^{2-}$, and $H_2PO_4^-$, provided for example by appropriate dissolved salts such as $Na_3PO_4$, $Na_2HPO_4$ or $NaH_2PO_4$ respectively or by orthophosphoric acid ($H_3PO_4$) or by both. Preferably, the electrolyte is acidic, for example, of pH less than 4 such as about pH 2.

The metal phosphate is preferably a transition metal phosphate such as a zirconium or titanium phosphate, the above-mentioned zirconium phosphate being preferred.

The invention will now be particularly described, by way of example only, as follows.

EXAMPLE

A zirconium phosphate electrochemical ion exchange electrode (54 g) had been used continuously for 3 months in a flow cell in an electrochemical ion exchange process. The process had been about 80% cathodic and 20% anodic. Some of the zirconium phosphate had, as a result, been hydrolysed to $Zr(OH)_4$. A standard electrochemical ion exchange batch test on the resulting electrode showed that it would reduce 200 p.p.m. caesium (as $Cs_2CO_3$) to only 20 p.p.m., compared with the usual figure of 0.1 p.p.m. Also, the cell voltage required for a current of 3 mA/cm$^2$ was increased to about 50V compared with the usual figure of about 30V, i.e. the cell had a very high resistance.

An electrochemical cell was established in which the anode was the electrode used as above, the electrolyte was an aqueous solution comprising 1M $NaH_2PO_4$ and 0.2M $H_3PO_4$, and the counter electrode was platinised titanium. The used electrode was anodised at 3 mA/cm$^2$ for about 5 days following which it was tested in the above-mentioned standard test and shown to reduce 200 p.p.m. caesium (as $Cs_2CO_3$) to 0.1 p.p.m. Moreover, the cell voltage was reduced to 10 V which was considerably lower than the initial voltage.

EXAMPLE

An electrochemical ion exchange electrode was made from zirconia (25 g zirconia, area 50 cm$^2$). To remove sorbed ions the electrode was held anodic for 2 hours in pure water, to desorb cations, and then after thorough flushing it was held cathodic for 2 hours in pure water to desorb anions. It was then tested as an electrochemical ion exchange electrode to remove caesium ions from an aqueous solution; 200 p.p.m. caesium as $Cs_2CO_3$ was reduced to 60 p.p.m. and the pH decreased.

Anions and cations were again desorbed into pure water. The electrode was then held at anodic potential with a current of 5 mA/cm$^2$ in dilute phosphoric acid, for a period of about 5 hours. The electrolyte was 1 liter of phosphoric acid with initially about 1080 p.p.m. $PO_4$ ions. The phosphate ions were absorbed into the electrode, the concentration in the electrolyte falling to about 0.2 p.p.m., and the end point being indicated by a sigmoidal increase in both pH and cell voltage to respective plateaux. This procedure was repeated three times in all. If the formula of the zirconia is assumed to be $Zr(OH)_4$, then the amount of phosphate absorbed (3.22 g) would lead to about 10% conversion to zirconium phosphate. If the zirconia is more highly hydrated then the extent of conversion is actually higher.

After desorption of any cations into pure water by holding the electrode anodic for 2 hours, the electrode was then tested as an electrochemical ion exchange electrode. Very little phosphate was eluted (final concentration less than 10 p.p.m.). After 3 hours absorption it had reduced the caesium concentration to 14 p.p.m. This shows a considerable improvement over the performance of the initial zirconia electrode. It is thus apparent that hydrous zirconia can be converted into zirconium phosphate in an electrochemical ion exchange electrode, so improving its ability to absorb cations.

We claim:

1. A method for electrochemically forming metal phosphate on an electrode, comprising:
   (a) placing in an electrochemical cell an electrode which includes an at least partially hydrolyzed metal phosphate as a cation exchange material;
   (b) passing electric current through the electrochemical cell with the electrode of step (a) functioning as an anode and in the presence of an electrolyte comprising an aqueous solution of phosphate ions;
   (c) forming metal phosphate on the electrode of step (a) by reversal of the metal phosphate hydrolysis reaction.

2. A method as claimed in claim 1, wherein the phosphate ions are selected from the group consisting of $PO_4^{3-}$, $HPO_4^{2-}$, $H_2PO_4^-$, and mixtures thereof.

3. A method as claimed in claim 1, wherein the electrolyte is acidic.

4. A method as claimed in claim 3, wherein the electrolyte has a pH less than 4.

5. A method of converting zirconium hydroxide into zirconium hydrogen phosphate, wherein the zirconium hydroxide is mixed with a binder and bonded to an electric current feeder to form an electrode, the method comprising operating an electrochemical cell with the said electrode as an anode and with an aqueous solution containing phosphate ions as an electrolyte, so that the zirconium hydroxide is converted into zirconium hydrogen phosphate.

6. A method as claimed in claim 5, wherein the phosphate ions are selected from the group consisting of $PO_4^{3-}$, $HPO_4^{2-}$, $H_2PO_4^-$, and mixtures thereof.

7. A method as claimed in claim 5, wherein the electrolyte is acidic.

8. A method as claimed in claim 7, wherein the electrolyte has a pH less than 4.

9. A method of adjusting the proportions of metal hydroxide and hydrolyzable metal phosphate in a mixture of the metal hydroxide and the hydrolyzable metal phosphate, the mixture being bonded together by a binder, the method comprising operating an electrochemical cell with the said mixture in contact with an anodic electrode and with an aqueous solution containing phosphate ions as an electrolyte, so that at least some of the metal hydroxide is converted into said metal phosphate.

10. A method as claimed in claim 9, wherein the phosphate ions are selected from the group consisting of $PO_4^{3-}$, $HPO_4^{2-}$, $H_2PO_4^-$, and mixtures thereof.

11. A method as claimed in claim 9, wherein the electrolyte is acidic.

12. A method as claimed in claim 11, wherein the electrolyte has a pH less than 4.

13. A method of treating an electrode which comprises an electric current feeder and an intimate mixture of ion exchange material and a binder, wherein the ion exchange material at least partly comprises a metal hydroxide formed by hydrolysis of an hydrolyzable metal phosphate, the method comprising operating an electrochemical cell with the said electrode as an anode and with an aqueous solution containing phosphate ions as an electrolyte, so that the metal hydroxide is converted to the said metal phosphate.

14. A method as claimed in claim 13, wherein the phosphate ions are selected from the group consisting of $PO_4^{3-}$, $HPO_4^{2-}$, $H_2PO_4^-$, and mixtures thereof.

15. A method as claimed in claim 13, wherein the electrolyte is acidic.

16. A method as claimed in claim 15, wherein the electrolyte has a pH less than 4.

* * * * *

UNITED STATES PATENT AND TRADEMARK OFFICE
CERTIFICATE OF CORRECTION

PATENT NO. : 5,766,442
DATED : June 16, 1998
INVENTOR(S) : Nevill John Bridger, et al It is certified that error appears in the above-identified patent and that said Letters Patent is hereby corrected as shown below:

Column 1, line 8, delete "the regeneration of electrodes" and substitute therefor --electrolytic methods of making a metal phosphate material, which is suitable--;

Column 1, line 44, delete "regenerating an electrode such as the above" and substitute therefor --reversing the hydrolysis reaction (1)--;

Column 1, line 46, delete "of regenerating an electrode for";

Column 1, lines 47-55, delete these lines and substitute therefor -- for electrochemically forming metal phosphate on an electrode, comprising:

(a) placing in an electrochemical cell an electrode which includes an at least partially hydrolyzed metal phosphate as a cation exchange material;

(b) passing electric current through the electrochemi-cal cell with the electrode of step (a) functioning as an anode and in the presence of an electrolyte comprising an aqueous solution of phosphate ions;

(c) forming metal phosphate on the electrode of step (a) by reversal of the metal phosphate hydrolysis reaction.--

Column 2, between lines 3 and 4, insert the following:

-- The invention also provides a method of converting zirconium hydroxide into zirconium hydrogen phosphate, wherein the zirconium hydroxide is mixed with a binder and bonded to an electric current feeder to form an electrode, the method comprising operating an electrochemical cell with the said electrode as an anode and with an aqueous solution containing phosphate ions as an electrolyte, so that the zirconium hydroxide is converted into zirconium hydrogen phosphate.

UNITED STATES PATENT AND TRADEMARK OFFICE
CERTIFICATE OF CORRECTION

PATENT NO.  : 5,766,442
DATED       : June 16, 1998
INVENTOR(S) : Nevill John Bridger, et al It is certified that error appears in the above-identified patent and that said Letters Patent is hereby corrected as shown below:

The invention also provides a method of adjusting the proportions of metal hydroxide and hydrolyzable metal phosphate in a mixture of the metal hydroxide and the hydrolyzable metal phosphate, the mixture being bonded together by a binder, the method comprising operating an electrochemical cell with the said mixture in contact with an anodic electrode and with an aqueous solution containing phosphate ions as an electrolyte, so that at least some of the metal hydroxide is converted into said metal phosphate.

Also, the invention provides a method of treating an electrode which comprises an electric current feeder and an intimate mixture of ion exchange material and a binder, wherein the ion exchange material at least partly comprises a metal hydroxide formed by hydrolysis of an hydrolyzable metal phosphate, the method comprising operating an electrochemical cell with the said electrode as an anode and with an aqueous solution containing phosphate ions as an electrolyte, so that the metal hydroxide is converted to the said metal phosphate.--

Signed and Sealed this

Eighth Day of September, 1998

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,766,442

DATED : June 16, 1998

INVENTOR(S) : NEVILL JOHN BRIDGER; ANDREW DEREK TURNER

It is certified that error appears in the above—identified patent and that said Letters Patent is hereby corrected as shown below:

Column 1, line 8, delete "the regeneration of electrodes" and substitute therefor --electrolytic methods of making a metal phosphate material, which is suitable--;

Column 1, line 44, delete "regenerating an electrode such as the above" and substitute therefor --reversing the hydrolysis reaction (1)--;

Column 1, line 46, delete "of regenerating an electrode for";

Column 1, lines 47-55, delete these lines and substitute therefor -- for electrochemically forming metal phosphate on an electrode, comprising:

(a) placing in an electrochemical cell an electrode which includes an at least partially hydrolyzed metal phosphate as a cation exchange material;

(b) passing electric current through the electrochemi-cal cell with the electrode of step (a) functioning as an anode and in the presence of an electrolyte comprising an aqueous solution of phosphate ions;

(c) forming metal phosphate on the electrode of step (a) by reversal of the metal phosphate hydrolysis reaction.--

Column 2, between lines 3 and 4, insert the following:

-- The invention also provides a method of converting zirconium hydroxide into zirconium hydrogen phosphate, wherein the zirconium hydroxide is mixed with a binder and bonded to an electric current feeder to form an electrode, the method comprising operating an electrochemical cell with the said electrode as an anode and with an aqueous solution containing phosphate ions as an electrolyte, so that the zirconium hydroxide is converted into zirconium hydrogen phosphate.

UNITED STATES PATENT AND TRADEMARK OFFICE
CERTIFICATE OF CORRECTION

PATENT NO. : 5,766,442
DATED : June 16, 1998
INVENTOR(S) : NEVILL JOHN BRIDGER; ANDREW DEREK TURNER It is certified that error appears in the above—identified patent and that said Letters Patent is hereby corrected as shown below:

The invention also provides a method of adjusting the proportions of metal hydroxide and hydrolyzable metal phosphate in a mixture of the metal hydroxide and the hydrolyzable metal phosphate, the mixture being bonded together by a binder, the method comprising operating an electrochemical cell with the said mixture in contact with an anodic electrode and with an aqueous solution containing phosphate ions as an electrolyte, so that at least some of the metal hydroxide is converted into said metal phosphate.

Also, the invention provides a method of treating an electrode which comprises an electric current feeder and an intimate mixture of ion exchange material and a binder, wherein the ion exchange material at least partly comprises a metal hydroxide formed by hydrolysis of an hydrolyzable metal phosphate, the method comprising operating an electrochemical cell with the said electrode as an anode and with an aqueous solution containing phosphate ions as an electrolyte, so that the metal hydroxide is converted to the said metal phosphate.--

Signed and Sealed this

Twenty-ninth Day of September, 1998

Attest:

BRUCE LEHMAN

*Attesting Officer*      *Commissioner of Patents and Trademarks*